United States Patent
Cook

(10) Patent No.: US 11,287,637 B2
(45) Date of Patent: Mar. 29, 2022

(54) MULTI-CHANNEL SENSOR USING A REAR-STOPPED REFLECTIVE TRIPLET

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

(*) Notice: Subject to any disclaimer, the term of this patent is extended or adjusted under 35 U.S.C. 154(b) by 10 days.

(21) Appl. No.: 16/749,136

(22) Filed: Jan. 22, 2020

(65) Prior Publication Data

US 2021/0223534 A1     Jul. 22, 2021

(51) Int. Cl.
| | |
|---|---|
| *G02B 23/06* | (2006.01) |
| *H04N 5/33* | (2006.01) |
| *G02B 27/10* | (2006.01) |
| *G02B 27/14* | (2006.01) |

(52) U.S. Cl.
CPC ......... *G02B 23/06* (2013.01); *G02B 27/1006* (2013.01); *G02B 27/141* (2013.01); *H04N 5/33* (2013.01)

(58) Field of Classification Search
CPC .. G02B 23/06; G02B 27/1006; G02B 27/141; H04N 5/33
USPC ........................................................ 348/164
See application file for complete search history.

(56) References Cited

U.S. PATENT DOCUMENTS

| | | | |
|---|---|---|---|
| 3,460,886 A | | 8/1969 | Lower et al. |
| 4,240,707 A | | 12/1980 | Wetherell et al. |
| 4,733,955 A | | 3/1988 | Cook |
| 4,804,258 A | * | 2/1989 | Kebo ................. G02B 17/0657 359/366 |
| 5,260,767 A | | 11/1993 | Cook |
| 5,640,283 A | * | 6/1997 | Warren .............. G02B 17/0642 359/366 |

(Continued)

FOREIGN PATENT DOCUMENTS

| | | |
|---|---|---|
| EP | 1026534 A1 | 8/2000 |
| EP | 2657746 A1 | 10/2013 |
| WO | 2009139767 A1 | 11/2009 |

OTHER PUBLICATIONS

International Search Report and Written Opinion in International Patent Application No. PCT/US2020/066328 dated Apr. 8, 2021.

*Primary Examiner* — Christopher S Kelley
*Assistant Examiner* — Kathleen M Walsh
(74) *Attorney, Agent, or Firm* — Lando & Anastasi, LLP

(57) ABSTRACT

An optical sensor system includes a primary mirror configured to receive electromagnetic radiation from the objects, a secondary mirror configured to receive the electromagnetic radiation reflected from the primary mirror, and a tertiary mirror configured to receive the electromagnetic radiation reflected from the secondary mirror. The system further includes a dichroic beamsplitter configured to direct electromagnetic radiation from a first spectrum along a first axis and to direct electromagnetic radiation from a second spectrum along a second axis. The system further includes a first image plane configured to receive the electromagnetic radiation from the first spectrum along the first axis to form a first image of the objects and a second image plane configured to receive the electromagnetic radiation from the second spectrum along the second axis to form a second image of the objects.

16 Claims, 2 Drawing Sheets

(56) References Cited

U.S. PATENT DOCUMENTS

| | | | | |
|---|---|---|---|---|
| 5,847,879 A * | 12/1998 | Cook | ................ | G02B 17/0642 |
| | | | | 359/631 |
| 5,926,283 A * | 7/1999 | Hopkins | ............... | G01J 3/2823 |
| | | | | 356/419 |
| 6,100,974 A | 8/2000 | Reininger | | |
| 7,382,498 B1 | 6/2008 | Cook | | |
| 8,248,693 B2 * | 8/2012 | Cook | ..................... | G02B 5/006 |
| | | | | 359/399 |
| 9,354,116 B1 | 5/2016 | Cook | | |
| 2006/0262406 A1 * | 11/2006 | Wang | ................ | G02B 27/1073 |
| | | | | 359/618 |
| 2007/0086087 A1 * | 4/2007 | Dent | ...................... | G02B 15/04 |
| | | | | 359/399 |
| 2010/0110539 A1 * | 5/2010 | Cook | ..................... | G02B 5/006 |
| | | | | 359/366 |
| 2018/0106673 A1 * | 4/2018 | Pagano | ..................... | G01J 3/36 |
| 2018/0292258 A1 * | 10/2018 | Spencer | ............... | G01J 3/0294 |
| 2019/0339123 A1 * | 11/2019 | Farsad | ................. | G01J 3/1809 |
| 2020/0049558 A1 * | 2/2020 | Farsad | ................. | G01J 3/0208 |

* cited by examiner

MULTI-CHANNEL SENSOR USING A REAR-STOPPED REFLECTIVE TRIPLET

BACKGROUND

The present invention relates to a multi-channel sensor using a rear-stopped reflective triplet optical sensor system.

Electromagnetic radiation imaging systems have been widely used to image objects at long distances by telescopes in the visual and infrared portions of the electromagnetic radiation spectrum. Generally, optical elements of long-distance telescopes may be refractive or reflective. Refractive optical elements are generally effective in controlling and/or preventing aberrations, and may be used in a variety of applications. However, refractive optical elements are not optimum for applications that require a large aperture or broad spectral coverage. Such refractive optical elements (e.g., lenses) are difficult to manufacture and result in greater expense, because it is necessary to manufacture large lens elements for these systems. The large lens elements also tend to flex, resulting in a decrease of image quality. Moreover, refractive optical elements by their nature may also absorb electromagnetic radiation because they are not completely transparent at certain wavelengths.

Reflecting optical elements, on the other hand, have been used in place of refractive optical elements to provide large aperture optical systems. Such reflecting optical elements may be manufactured with greater thickness so as not to flex as easily. In addition, reflective optical elements do not allow light to pass through, but rather, reflect electromagnetic radiation at most wavelengths, resulting in less loss of electromagnetic radiation.

The minimum number of optical elements is generally recognized to be three, to provide the minimum number of parameters that are necessary to correct for and/or prevent spherical aberration, coma, astigmatism and field curvature. An optical imaging system composed of three optical elements is known as a triplet.

Reflective optical triplets are generally constructed such that electromagnetic radiation enters the system from a distant object, is received on a primary mirror, is reflected onto a secondary mirror, is received on a tertiary mirror, and finally, is focused on an image plane where an image of the distant object is formed. Many prior art reflective optical triplets are composed such that all of the optical elements lie on the optical axis of the optical system. This arrangement results in the occlusion of a significant portion of the electromagnetic radiation entering the system from a distant object, a restriction of the field of view of the system and a constraint on the power distribution between optical elements.

U.S. Pat. No. 8,248,693, which is incorporated herein by reference in its entirety for all purposes, discloses an all-reflecting, non-relayed optical system having an aperture stop and an optical axis and configured to provide images of objects. The system includes a positive power primary mirror configured to receive electromagnetic radiation from the objects, a negative power secondary mirror configured to receive the electromagnetic radiation reflected from the primary mirror and a positive power tertiary mirror configured to receive the electromagnetic radiation reflected from the secondary mirror. The system further includes a focal plane configured to receive the electromagnetic radiation reflected from the tertiary mirror and to form an image of the objects. The aperture stop of the optical system is located between the tertiary mirror and the image plane. Accordingly, the image plane may be cold shielded to prevent or reduce electromagnetic radiation reflected from the optical elements that interferes with the desired image.

SUMMARY OF INVENTION

One aspect of the present disclosure is directed to an optical sensor system having an aperture stop and an optical axis and configured to provide images of objects. In one embodiment, the system comprise a primary mirror configured to receive electromagnetic radiation from the objects, a secondary mirror configured to receive the electromagnetic radiation reflected from the primary mirror, and a tertiary mirror configured to receive the electromagnetic radiation reflected from the secondary mirror. The optical sensor system further comprises a dichroic beamsplitter configured to direct electromagnetic radiation from a first spectrum along a first axis and to direct electromagnetic radiation from a second spectrum along a second axis. The optical sensor system further comprises a first image plane configured to receive the electromagnetic radiation from the first spectrum along the first axis to form a first image of the objects and a second image plane configured to receive the electromagnetic radiation from the second spectrum along the second axis to form a second image of the objects.

Embodiments of the optical sensor system further may include a first aperture stop positioned between the beamsplitter and the first image plane. The optical sensor system further may include a second aperture stop positioned between the beamsplitter and the second image plane. The first aperture stop may be further positioned slightly above and to the right of the secondary mirror. The second aperture stop may be further positioned approximately slightly above and to the left of the secondary mirror. Electromagnetic radiation from the first spectrum may be visible light and electromagnetic radiation from the second spectrum may be IR light. Electromagnetic radiation from the first spectrum may be directed to the first image plane by a first mirror. Electromagnetic radiation from the second spectrum may be directed to the second image plane by a second mirror. The three mirrors constitute a reflective triplet optical form, with the dichroic beamsplitter being subsequent to the third mirror. At least one aperture stop is subsequent to the dichroic beamsplitter. A subsequent final scene image or images formed are subsequent to the at least one aperture stop, and are the only scene image or images formed by the optical system. The primary, secondary and tertiary mirrors may be off-axis from the optical axis of the optical sensor system. The primary mirror may be a positive power mirror, the secondary mirror may be a negative power mirror, and the tertiary mirror may be a positive power mirror.

Another aspect of the present disclosure is directed to a method of imaging objects in an optical sensor system. In one embodiment, the method comprises: reflecting electromagnetic radiation received from objects in a first direction relative to the optical axis utilizing a primary mirror; reflecting the electromagnetic radiation received from the first mirror in a second direction relative to the optical axis utilizing a secondary mirror; reflecting the electromagnetic radiation received from the secondary mirror in a third direction relative to the optical axis utilizing a tertiary mirror; directing electromagnetic radiation from a first spectrum along a first axis; directing electromagnetic radiation from a second spectrum along a second axis; forming a first image of the distant objects from electromagnetic radiation from the first spectrum along the first axis with a first image plane; and forming a second image of the distant objects from electromagnetic radiation from the second spectrum along the second axis with a second image plane.

Embodiments of the method further may include positioning a first aperture stop between the beamsplitter and the first image plane. A second aperture stop may be positioned between the beamsplitter and the second image plane. The first aperture stop may be further positioned slightly above and to the right of the secondary mirror. The second aperture stop may be further positioned approximately slightly above and to the left of the secondary mirror. Electromagnetic radiation from the first spectrum may be visible light and electromagnetic radiation from the second spectrum may be IR light. The method further may include directing electromagnetic radiation from the first spectrum to the first image plane by a first mirror and/or directing electromagnetic radiation from the second spectrum to the second image plane by a second mirror. The primary, secondary and tertiary mirrors are off-axis from the optical axis of the optical sensor system. The primary mirror may be a positive power mirror, the secondary mirror may be a negative power mirror, and the tertiary mirror may be a positive power mirror.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
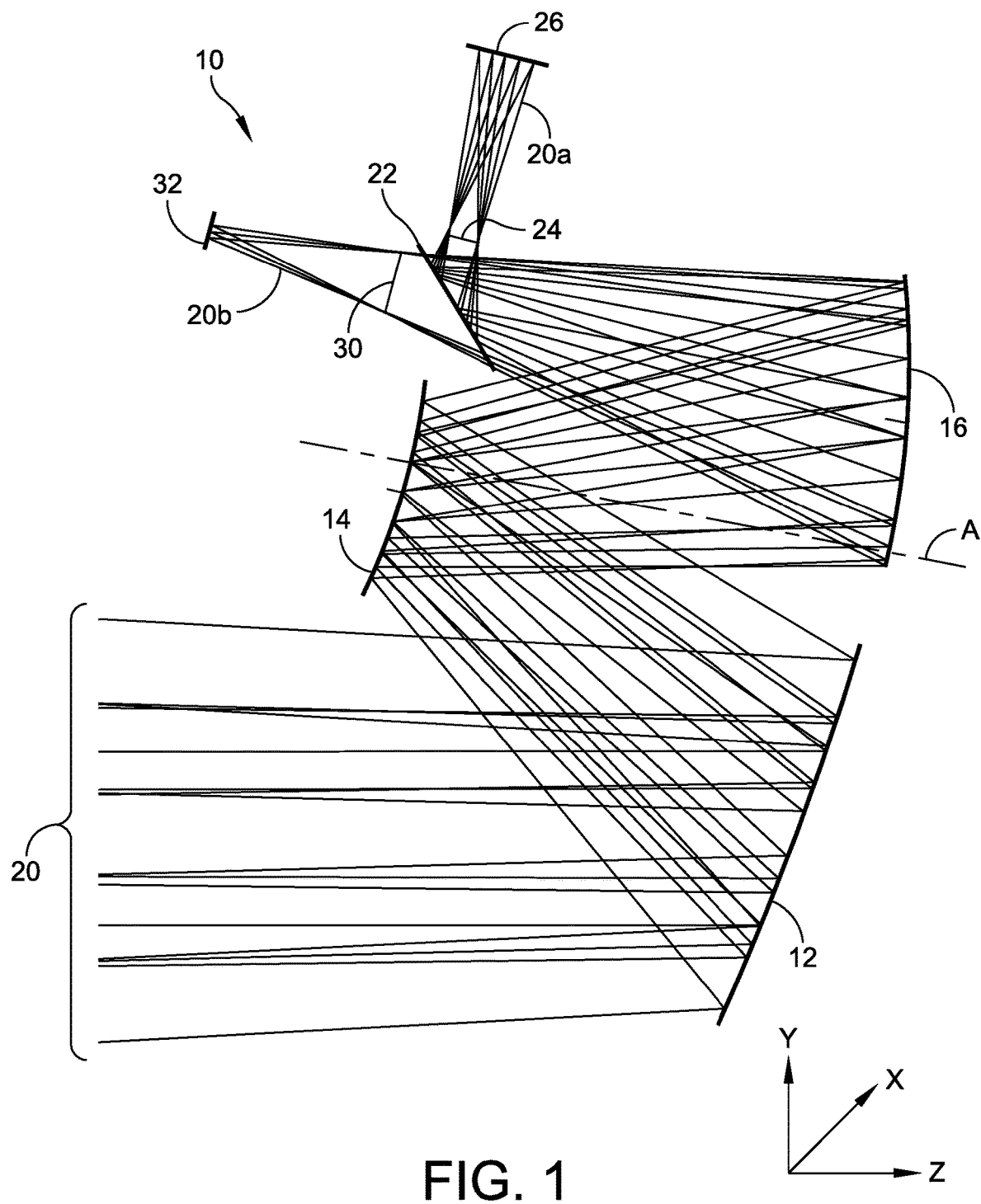
FIG. 1 is a side elevational view of a partial ray trace of one example of a reflective triplet according to aspects of the present disclosure.

A reflective triplet optical form with a rear aperture stop for cold shielding may be utilized to provide images of distant objects. Using all-reflecting optical elements, the system is configured such that the aperture stop of the optical system is between the last optical element and the image plane. With the aperture stop in this position, the image plane may be cold shielded more effectively than prior art systems. Therefore, it is possible to generate higher quality infrared images due to a decrease in electromagnetic radiation reflected and/or scattered from the optical elements and the structure within the optical system (i.e., decreased noise).

Embodiments of the present disclosure are directed to an optical system configured integrate high performance visible and infrared (IR) sensors into a single, very simple telescope. Usually, cold shielding requirements for IR sensors require the use of a classically relayed optical system. Embodiments of the present disclosure employ the unique characteristics of a rear-stopped reflective triplet (RT) to provide the needed cold shielding without the use of a relayed optical system. With the IR cold stop located at a rear pupil of the telescope, the IR focal plane array (FPA) view is confined to view just the mirror surfaces. Using a dichroic beamsplitter, the rear pupil is also the aperture stop for the visible FPA, and limits the view to just the mirror surfaces. By stopping the visible channel to half the IR aperture, the vis channel can have 4× the IR field of view (FOV), and not greatly stress the size of the telescope mirrors. The combination of visible and IR FPAs into a single all-reflective telescope that is not classically relayed results in the powers in the individual mirrors being greatly reduced. The use of a separate aperture stop in the visible channel at half the optical speed, allows the visible channel to have 4× the IR FOV. The long back focal length of the RT enables efficient electromagnetic radiation shielding of both channels using a tungsten laminate, for example, cavity that surrounds each FPA.

It is to be appreciated that embodiments systems discussed herein are not limited in application to the details of construction and the arrangement of components set forth in the foregoing description or illustrated in the accompanying drawings. The optical systems and components are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

FIG. 1 is a side elevational schematic view, taken in a tangential plane, of an exemplary optical sensor system, generally indicated at 10, including a reflective triplet optical form. As shown, the optical sensor system 10 includes an optical axis A, and includes a positive power primary mirror 12, a negative power secondary mirror 14 and a positive power tertiary mirror 16. The primary mirror 12, the secondary mirror 14 and the tertiary mirror 16 are all off-axis from the optical axis A.

The optical sensor system 10 as depicted in FIG. 1 includes a virtual entrance pupil. During operation, an electromagnetic radiation beam 20 first impinges on the primary mirror 12, reflects off of the primary mirror 12, impinges on the secondary mirror 14, reflects off of the secondary mirror 14, impinges on the tertiary mirror 16, and reflects off of the tertiary mirror 16. The construction of the primary components of the optical sensor system 10, e.g., the primary mirror 12, the secondary mirror 14, and the tertiary mirror 16, is similar to the system disclosed in U.S. Pat. No. 8,248,693 referenced above.

To achieve detection of images from visible and IR light sources, electromagnetic radiation reflected off of the tertiary mirror 16 is directed toward a dichroic beamsplitter 22 configured to reflect visible radiation in one direction and to transmit and direct IR radiation in another direction. In one embodiment, the dichroic beamsplitter 22 embodies an optical device, e.g., a cube, that splits the beam of electromagnetic radiation into two separate beams, e.g., a beam of visible radiation represented by 20a and a beam of IR radiation represented by 20b. In a particular embodiment, the dichroic beamsplitter 22 includes a dichroic coated plate assembly which uses dichroic optical coatings to divide incoming electromagnetic radiation 20 into distinct output beams 20a, 20b.

The visible light 20a reflected off of the dichroic beamsplitter 22 is directed to a visible aperture stop 24 configured to direct the visible light 20a toward a visible light image sensor 26. In one embodiment, the visible light image sensor 26 is configured to achieve a 6.0°×6.0° FOV, F/4.6 equivalent speed with 1.4× aspect ratio.

Similarly, the IR light 20b is transmitted and directed by the dichroic beamsplitter 22 to a cold IR stop 30 configured to direct the IR light 20b toward a cold IR image sensor 32. In one embodiment, the cold IR image sensor 32 is configured to achieve a 1.5°×1.5° FOV, F/2.3 equivalent speed with 1.4× aspect ratio. The result is excellent stray light containment and unobscured, with a smooth PSF lower emitted background constant collecting area.

The image sensors 26, 32 may embody a sensor that detects or conveys information from the electromagnetic radiation 20 to create an image. In some embodiments, the image sensors 26, 32 may include a charge-coupled device (CCD) or an active-pixel sensor, e.g., a complementary metal-oxide-semiconductor (CMOS). Other optical devices are contemplated.

In one embodiment, the visible aperture stop 24 is positioned between the beamsplitter 22 and the visible light image sensor 26 at an image plane, with the visible aperture stop 24 being further positioned slightly above and to the right of the secondary mirror 14. The cold IR stop 30 is positioned between the beamsplitter 22 and the cold IR image sensor 32 at an image plane, with the cold IR stop 30 being further positioned approximately slightly above and to the left of the secondary mirror 14.

Thus, it should be observed that the optical sensor system 10 including the three mirrors 12, 14, 16 constitute a reflective triplet optical form, with the dichroic beamsplitter 22 being positioned subsequent to the third mirror 16. The aperture stop or stops, e.g., aperture stops 24, 30 are positioned subsequent to the dichroic beamsplitter 22. The subsequent final scene image or images formed are subsequent to the aperture stop or stops, and are the only scene image or images formed by the optical sensor system 10.

Although FIG. 1 illustrates the dichroic beamsplitter 22 configured to direct visible light 20a in one direction and IR light 20b in another direction, different configurations are contemplated. For example, the dichroic beamsplitter 22 may be configured to direct electromagnetic radiation from different spectrums of light, e.g., microwaves and ultraviolet electromagnetic radiation. Moreover, light reflected off of the dichroic beamsplitter and directed through the dichroic beamsplitter may travel to more than one detectors. For example, the optical sensor system can include beamsplitters and FPAs to provide further detection, as well as fold mirrors.

In one embodiment, an image sensor is disposed on the image plane. The image sensor may be any suitable image sensor, and is not necessarily limited to use with certain wavelengths of electromagnetic radiation. The aperture stop determines the solid angle of the transmitted light cone for an on-axis object. It limits the brightness of an image. The perfect cold stop is defined as one that limits the reception of background radiation to the cone established by the F/# (i.e., 100% cold stop efficiency).

Figure 2:
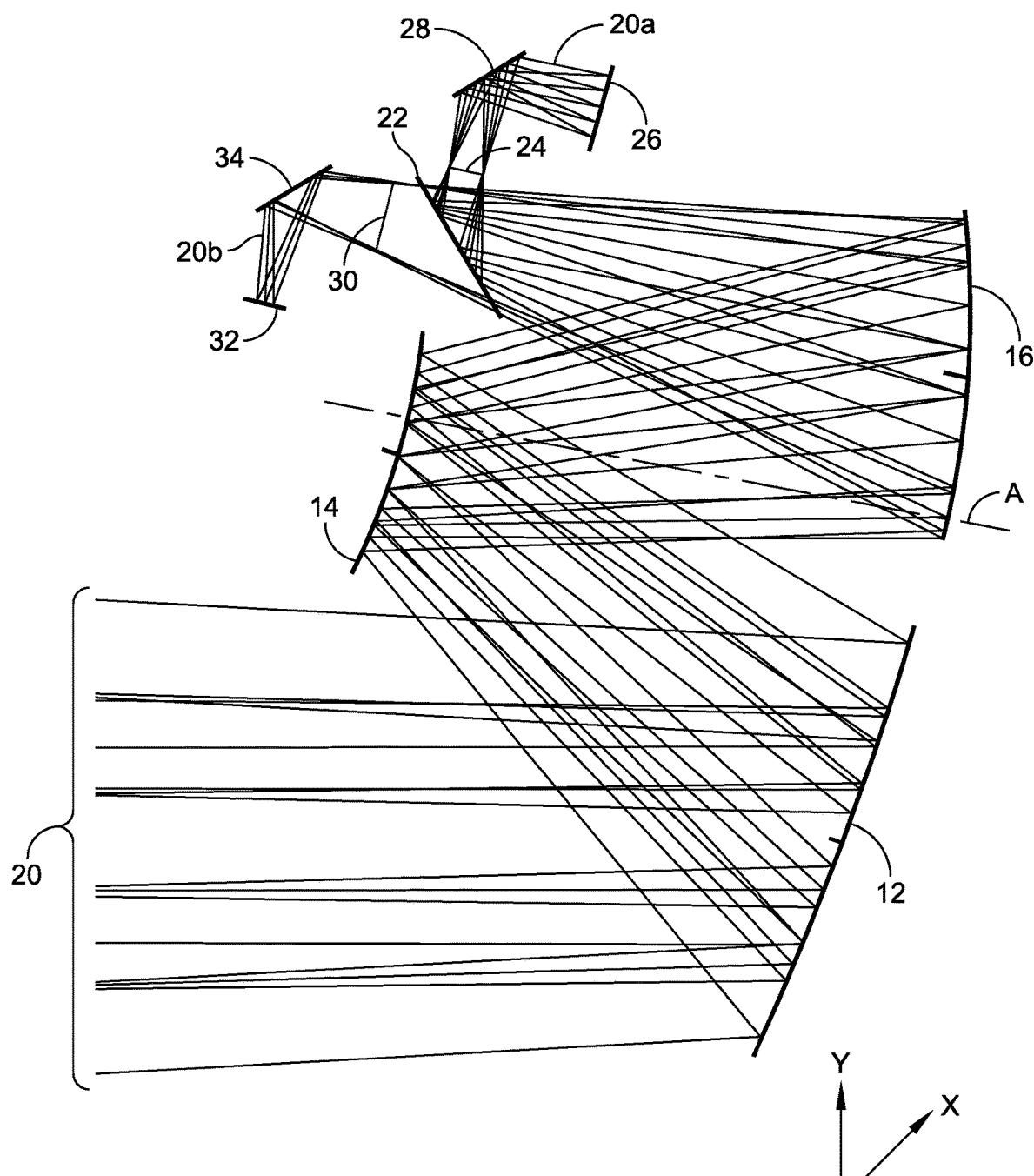
FIG. 2 is a side elevational view of a partial ray trace of another example of a reflective triplet showing a more compact design.

Embodiments of the optical sensor system include an optical sensor system identically constructed as optical sensor system 10, but more compact in construction. Referring to FIG. 2, an optical sensor system, generally indicated at 40, embodies similar components as optical sensor system 10. As shown, the optical sensor system 40 includes a primary mirror 12, a secondary mirror 14 and a tertiary mirror 16, which together directs electromagnetic radiation including visible light and IR light to the components described with reference to the optical sensor system shown in FIG. 1 to detect images from visible and IR light.

With optical sensor system 40, a dichroic beamsplitter 22 is provided to reflect visible radiation in one direction and to transmit and direct IR radiation in another direction. The visible light 20a reflected off of the dichroic beamsplitter 22 is directed to a visible aperture stop 24 configured to direct the visible light 20a toward a visible light image sensor 26. As shown, a mirror 28, e.g., a fold mirror, is provided to direct the visible light 20a to a desired target, i.e., the visible light image sensor 26. Similarly, the IR light 20b is transmitted and directed by the dichroic beamsplitter 22 to a cold IR stop 30 configured to direct the IR light 20b toward a cold IR image sensor 32. As shown, a mirror 34, e.g., a fold mirror, is provided to direct the IR light 20b to a desired target, i.e., the cold IR image sensor 32.

As with the optical system disclosed in U.S. Pat. No. 8,248,693, a defining aperture stop of the optical system is located between the tertiary mirror and the image plane, but positioned after the dichroic beamsplitter. In this position, the image plane and the image sensor may be placed inside a cryo-vac cold cavity to substantially completely cold shield the image plane and the image sensor. The optical elements in the reflective optical triplet (e.g., the primary mirror, the secondary mirror, and the tertiary mirror) are shielded from the image sensor by the cryo-vac cold cavity such that the image sensor sees only cold black Dewar walls (e.g., the cold walls of the cryo-vac cold cavity) and warm low-emissivity mirror surfaces, since the optical elements are all outside of the cryo-vac cold cavity. In this position, the aperture stop defines the Dewar boundary of the cryo-vac cold cavity, external to the optical elements. The external rear aperture stop location naturally results in the virtual entrance pupil shown in FIG. 1. The aperture stop as shown in FIG. 1 may be located slightly above and to the right of the secondary mirror, in reference to the tangential plane of the optical system. More specifically, the aperture stop may be located approximately halfway between the third mirror and the image plane.

The optical system, for example, is well suited for relatively fast system speeds in the range of, for example, F/2.0 to F/6.0. The optical system is also well suited for both two-dimensional and high aspect ratio fields of view. Both conic and general aspheric mirror geometries may be utilized in the various embodiments. The optical system may attain various levels of image quality, such as within the range of 10 to 100 microrads. In addition, the all-reflecting triplet is compact and images distant objects having fields of view comparable to a refracting triplet at larger aperture diameters. Moreover, as with all-reflecting systems, it is lightweight and accurate within a wide range of wavelengths.

It should be understood that the above described embodiments of the present invention are illustrative only and that modifications thereof may occur to those skilled in the art. Accordingly, the present invention is not to be regarded as limited to the embodiments disclosed herein, but is to be limited only as defined by the appended claims.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention.

What is claimed is:

1. An optical sensor system having an aperture stop and an optical axis and configured to provide images of objects, the system comprising:
 a primary mirror configured to receive electromagnetic radiation from the objects;
 a secondary mirror configured to receive the electromagnetic radiation reflected from the primary mirror;
 a tertiary mirror configured to receive the electromagnetic radiation reflected from the secondary mirror;
 a dichroic beamsplitter configured to direct electromagnetic radiation from a first spectrum along a first axis and to direct electromagnetic radiation from a second spectrum along a second axis;
 a first image plane configured to receive the electromagnetic radiation from the first spectrum along the first axis to form a first image of the objects;
 a second image plane configured to receive the electromagnetic radiation from the second spectrum along the second axis to form a second image of the objects;
 a first transmitting aperture stop positioned between the dichroic beamsplitter and the first image plane; and
 a second transmitting aperture stop positioned between the dichroic beamsplitter and the second image plane,
 wherein the first transmitting aperture stop and the second transmitting aperture stop are each located at a rear pupil of the optical sensor system.

2. The optical sensor system of claim 1, wherein the first transmitting aperture stop is further positioned slightly above and to the right of the secondary mirror.

3. The optical sensor system of claim 2, wherein the second transmitting aperture stop is further positioned slightly above and to the left of the secondary mirror.

4. The optical sensor system of claim 1, wherein electromagnetic radiation from the first spectrum is visible light and electromagnetic radiation from the second spectrum is IR light.

5. The optical sensor system of claim 1, wherein electromagnetic radiation from the first spectrum is directed to the first image plane by a first mirror.

6. The optical sensor system of claim 5, wherein electromagnetic radiation from the second spectrum is directed to the second image plane by a second mirror.

7. The optical sensor system of claim 1, wherein the three mirrors constitute a reflective triplet optical form,
 wherein the dichroic beamsplitter is subsequent to the tertiary mirror,
 wherein at least one transmitting aperture stop is subsequent to the dichroic beamsplitter, and
 wherein a subsequent final scene image or images formed are subsequent to the at least one transmitting aperture stop, and are the only scene image or images formed by the optical system.

8. The optical sensor system of claim 1, wherein the primary, secondary and tertiary mirrors are off-axis from the optical axis of the optical sensor system, and wherein the primary mirror is a positive power mirror, the secondary mirror is a negative power mirror, and the tertiary mirror is a positive power mirror.

9. A method of imaging objects in an optical sensor system, the method comprising:
 reflecting electromagnetic radiation received from objects in a first direction relative to an optical axis utilizing a primary mirror;
 reflecting the electromagnetic radiation received from the primary mirror in a second direction relative to the optical axis utilizing a secondary mirror;
 reflecting the electromagnetic radiation received from the secondary mirror in a third direction relative to the optical axis utilizing a tertiary mirror;
 directing electromagnetic radiation from a first spectrum along a first axis;
 directing electromagnetic radiation from a second spectrum along a second axis;
 forming a first image of distant objects from electromagnetic radiation from the first spectrum along the first axis with a first image plane; and
 forming a second image of the distant objects from electromagnetic radiation from the second spectrum along the second axis with a second image plane,
 wherein a first transmitting aperture stop is positioned between a dichroic beamsplitter and the first image plane,
 wherein a second transmitting aperture stop is positioned between a dichroic beamsplitter and the second image plane, and
 wherein the first transmitting aperture stop and the second transmitting aperture stop are each located at a rear pupil of the optical sensor system.

10. The method of claim 9, wherein the first transmitting aperture stop is further positioned slightly above and to the right of the secondary mirror.

11. The method of claim 10, wherein the second transmitting aperture stop is further positioned slightly above and to the left of the secondary mirror.

12. The method of claim 9, wherein electromagnetic radiation from the first spectrum is visible light and electromagnetic radiation from the second spectrum is IR light.

13. The method of claim 9, further comprising directing electromagnetic radiation from the first spectrum to the first image plane by a first mirror.

14. The method of claim 13, further comprising directing electromagnetic radiation from the second spectrum to the second image plane by a second mirror.

15. The method of claim 9, wherein the three mirrors constitute a reflective triplet optical form,
 wherein the dichroic beamsplitter is subsequent to the tertiary mirror,
 wherein at least one transmitting aperture stop is subsequent to the dichroic beamsplitter, and
 wherein a subsequent final scene image or images formed are subsequent to the at least one transmitting aperture stop, and are the only scene image or images formed by the optical system.

16. The method of claim 9, wherein the primary, secondary and tertiary mirrors are off-axis from the optical axis of the optical sensor system, and wherein the primary mirror is a positive power mirror, the secondary mirror is a negative power mirror, and the tertiary mirror is a positive power mirror.

* * * * *